Nov. 12, 1963   A. W. TRIVELPIECE   3,110,839
TRAVELING WAVE TUBE
Filed May 18, 1960
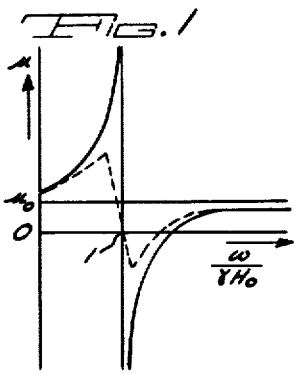
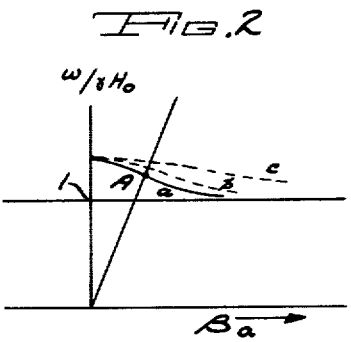
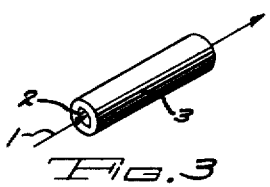
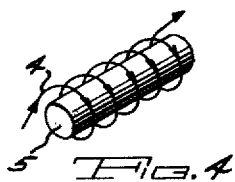
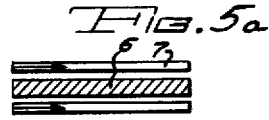
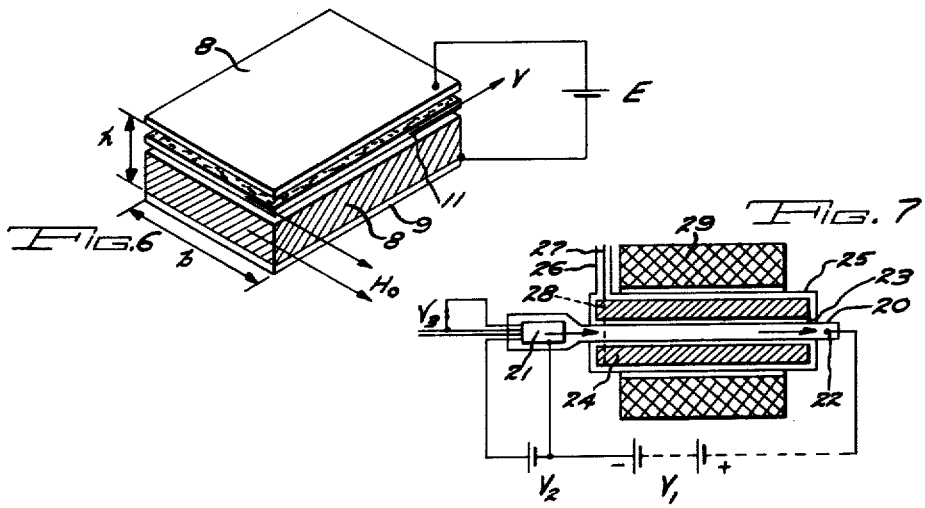
INVENTOR.
Alvin W. Trivelpiece
BY
ATTORNEY

United States Patent Office 3,110,839
Patented Nov. 12, 1963

3,110,839
TRAVELING WAVE TUBE
Alvin W. Trivelpiece, Walnut Creek, Calif., assignor to Varian Associates, Palo Alto, Calif., a corporation of California
Filed May 18, 1960, Ser. No. 29,862
14 Claims. (Cl. 315—3.5)

This invention relates generally to traveling wave tubes and their use for the purpose of amplification and generation of high frequency electromagnetic waves.

Traveling wave tubes generally consist of a slow wave propagating structure through or along which an electron beam is directed so that an interaction between this electron beam and a component of the electromagnetic wave on the structure may occur. For interaction to occur, the wave on the circuit must have a phase velocity which is almost equal to the velocity of the electron beam. The usual type of circuit employed for this purpose is a helix or a periodically loaded waveguide. For such circuits, several modes can propagate. Each of these modes consists of a family of spatial harmonics, some of which may have the same phase velocity as the mean velocity of the electron beam. The frequency at which these tubes operate is principally determined by the physical dimensions of the propagating system. This requires that a high degree of precision be maintained in the construction and fabrication of the slow wave circuit employed in the traveling wave tube, particularly if the tube is to be used for very short wavelength operation.

In addition to interaction with the forward wave (a wave with positive group and phase velocity), interaction with a backward wave (a wave with negative group and positive phase velocity) is also possible. Difficulties can arise whenever the beam has a tendency to interact with one or more modes or with one or more spatial harmonics at one time.

The present invention employs a wave propagating structure of a material which possesses the properties necessary for ferrimagnetic resonance such as, for example, a hollow rod or cylinder of ferrite which is placed in a steady magnetic field of such a value that the precession resonance frequency in the ferrite is slightly less than the desired operating frequency of the tube. The permeability of a ferrite transverse to the direction of the applied magnetic field is negative over a narrow frequency band which lies just above the precession resonance frequency and this negative transverse permeability gives rise to a backward wave mode of propagation in the ferrite which has a phase velocity that corresponds to the electron velocities of practical realizable electron beams. The frequency band at which interaction of an electron beam will take place with this ferrite structure is determined by the strength of the applied magnetic field and therefore tuning to a desired frequency band is possible by controlling the strength of this applied magnetic field. Frequencies within the band may be tuned by changing the voltage of the electron beam. The physical dimensions of the ferrite structure play a lesser role with respect to the determination of the operating frequency. Since the ferrite structure employed as the slow wave circuit has no characteristic spatial periodicity, no spatial harmonics will occur and the operation of the tube will be stable, i.e., jumping to an undesired mode having a spatial harmonic with the proper velocity for interaction is not possible. Whenever the transverse dimensions of the ferrite rod are such that the circumference is much less than a free space wavelength, no modes of a forward wave nature (positive phase and group velocity) are possible in the ferrite.

Traveling wave tubes made in accordance with this invention will operate at frequencies in the microwave range and may be extendable to operation in the millimeter range of frequencies.

This invention will be described with reference to the use of ferrites but it is understood that other materials exhibiting the desired resonance characteristics may be utilized such as, for example, yttrium iron garnet, polycrystalline substituted yttrium iron garnets, gadolinium iron garnet, and yttrium-gallium iron garnet.

The object of this invention is to provide a novel traveling wave tube employing a slow wave structure made of a material which possesses the properties necessary for ferrimagnetic resonance resulting in unique electron beam, traveling wave interaction.

One feature of this invention is the provision of a traveling wave tube in which the slow wave structure comprises a body of ferrimagnetic resonance material positioned, in use, in a magnetic field of a strength such as to produce precession resonance in the structure at a frequency slightly less than the desired operating frequency of the tube which gives rise to backward wave propagation on the slow wave structure.

Another feature of this invention is the provision, in a traveling wave tube of the above featured type, of a slow wave structure adapted for suitable interaction with an electron beam; for example, a slab or a hollow cylinder or the like.

Still another feature of this invention is the provision of traveling wave tubes incorporating the above features arranged for amplification or oscillation generation.

These and other features and advantages of this invention will become apparent upon a study of the specification taken in connection with the accompanying drawings wherein, FIG. 1 is a diagram showing the transverse permeability of a piece of magnetized ferrite in which the phenomenon of precession resonance is possible.

FIG. 2 shows the phase characteristics of the backward wave modes which are utilized in this invention, FIGS. 3, 4, 5a, 5b and 6 show various ways in which the electron beam can be directed with respect to the ferrite, and FIG. 7 shows a schematic diagram of a particular form of construction of a traveling wave tube as described in this invention for the purpose of the generation of high frequency electromagnetic waves.

FIG. 1 shows the permeability of a ferrite material transverse to the direction of the applied magnetic field $H_0$ as a function of frequency. The ferrite exhibits an anisotropic permeability as a result of the applied magnetic field; the frequency dependent behavior of the ferrite is a result of the known phenomenon of precession or ferrimagnetic resonance. In this diagram the value of the permeability perpendicular to the direction of the magnetic field, or more properly the first two diagonal components of the permeability tensor, is plotted along the vertical axis while the quantity proportional to the radian frequency $(\omega/\gamma H_0)$ is plotted along the horizontal axis. The factor $\gamma$ is known as the gyromagnetic ratio of the ferrite material and $H_0$ is the value of the applied D.C. magnetic field, here presumed to be greater than that required for saturation of the ferrite.

As the frequency increases from a value less than that necessary to produce ferrimagnetic resonance in the particular field $H_0$, the permeability increases in the positive direction and become infinite ($\infty$) at the precession resonance frequency. Above the precession resonance frequency the permeability starts at minus $\infty$ and increases in the positive direction passing through the zero at the point $\gamma H_0 (1 + M_0/\mu_0 H_0)^{1/2}$. As the frequency is increased further the permeability asymptotically approaches the value of $\mu_0$, i.e., the permeability of free space. The case just described is for a lossless ferrite and is shown in the diagram by a solid line. The quantity $M_0$ is the saturation magnetization of the ferrite. When losses are taken into account one obtains the dashed-curve, and as can be seen the permeability of the ferrite does not achieve infinite values. However, even when losses are included, negative values of the transverse permeability are still realizable for frequencies slightly above the precession resonance frequency.

A piece of magnetized ferrite interacting with an electron beam will support backward wave propagation, and the phase velocity of the waves can be much less than the velocity of light. Considering a ferrite rod which has been longitudinally magnetized with the propagation in the direction of the applied magnetic field, the transmission characteristics, i.e., the propagation constant $\beta$ as a function of frequency, are shown in FIG. 2. To obtain a diagram involving the dimensionless quanities, the frequency has been divided by $\gamma H_0$ and the propagation constant has been multiplied by $a$, where $a$ is the radius of the ferrite rod.

Within the pass band shown in FIG. 2, a large number of modes of propagation are possible; however, these are not spatial harmonics. FIG. 2 shows the transmission characteristics for three such modes labeled $a$, $b$, and $c$. The fact that these are backward waves follows from the diagram in that the slope of the characteristic curve is negative for frequencies where the phase velocity is positive. These waves may have a phase velocity which is sufficiently small that it lies in the range of practical realizable electron beams. Thus the wave propagating in the ferrite can be brought into synchronism with the electron beam which is flowing parallel to the direction of propagation of these modes. The phase velocities which can be realized in practice are as low as one one-hundredth of the velocity of light.

In FIG. 2, a straight line is drawn through the origin to indicate the constant velocity of the electron beam. The point at which this line intersects the transmission characteristic indicates the point at which the electron stream will be in synchronism with the wave propagating in the ferrite. Interaction with any of the higher order propagating modes is possible; however, in a practical case the interaction with the lowest mode is sufficiently more efficient that the higher mode interaction will not give rise to any difficulties. Only the interaction indicated at the point A will be significant.

To simplify the theoretical calculations the following assumptions are made: (1) the ferrite rod is of circular cross-section and has a radius $a$; (2) the ferrite rod is contained in a closely fitting perfectly conducting waveguide with a circular cross-section having the same radius $a$; (3) the radius $a$ is so small that no modes propagate in the waveguide when it is empty or when it is filled with unmagnetized ferrite. The propagation constant that one obtains for a perfectly conducting waveguide of radius $a$ filled with longitudinally magnetized ferrite is for the axially symmetric mode $$\frac{\beta_\mathrm{a}}{p_{1\gamma}} = \left[ -\frac{M_0/\mu_0 H_0}{1-(\omega/\gamma H_0)^2} - 1 \right]^{1/2}$$

As an additional simplifying assumption the losses in the ferrite have been neglected. Actual tests with, for example, $M_{n1.03}Al_{0.72}Fe_{1.25}O_4$ ferrite, have shown that the phase characteristics in the region of interest differ only slightly as a result of losses.

For practical cases, it is not essential that the above simplifying assumptions be satisfied. For instance, the waveguide may have a much larger radius than the ferrite, and in fact, the ferrite need not be surrounded by a conducting waveguide at all. Metallic boundaries on the ferrite are not in principle necessary but may be useful for reasons of propagation or for structural reasons. The ferrite rod may also be a hollow cylinder through which an electron beam may pass, and the ferrite cylinder may serve as part of the vacuum envelope of the traveling wave tube.

Since the precession resonance frequency is a function of the strength of the applied magnetic field, a frequency band at which propagation through the ferrite takes place can be adjusted by this field and the actual frequency within the band adjusted electrically. This proves to be an advantage over conventional traveling wave tubes where the operating frequency is determined more critically by the physical dimensions of the wave propagating structure. A traveling wave tube as described in this invention may have a possible frequency variation of about 1:3. The operating frequency of this tube is in the microwave range and may possibly be extended into the millimeter wave range.

The electron beam and slow wave structure may take any of a number of specific forms. FIG. 3 is a diagram showing a ferrite cylinder 3 having an axial bore 2 through which the electron beam 1 passes coaxially. It is also possible as indicated in FIG. 4 to direct the electron stream 4 in a helical path around the ferrite rod 5. It is also possible to use instead of one, several helical electron beams. Passing to the limit of a large number of helical electron beams, one obtains the case shown in FIGS. 5$a$ and 5$b$ where a ferrite rod 6 is enclosed by a coaxial cylindrical electron beam 7. As indicated by the arrows, the electrons have both an axial and azimuthal velocity component which is to say that the individual electrons follow a helical path.

A completely different method of focusing the electron beam so that it may interact with the wave in the ferrite, is shown in FIG. 6. The waveguide is formed by conducting parallel plates 8 and 9. The width of the plates is chosen to be arbitrarily large and is unimportant as far as the wave propagation characteristics are concerned. The separation $h$ between the parallel plates determines the characteristics of the waveguide formed by the plates. The space between the plates is partially filled by a rectangular piece of ferrite 10 which is in contact with the lower plate 9. The ferrite is magnetized by the applied magnetic field $H_0$ in the direction shown so that the desired type of wave propagation through the ferrite is possible. In the space between the upper surface of the ferrite and the lower surface of the upper conducting plate 8, a strip electron beam 11 is directed as indicated by the arrow $v$. This electron beam has the right velocity to interact with the field of the wave which propagates in the ferrite. In order that the electron beam 11 not be deflected by the magnetic field $H_0$, an electric field is introduced perpendicular to the direction of the magnetic field of a value such that the electron beam will flow parallel between the plate and the ferrite. It is also possible to have the electron beam flow parallel to the magnetic field. In such a case, the best (but not only) configuration is to have the beam flow between two ferrite slabs which is similar in principle to the above described ferrite tube illustration.

Traveling wave tubes as described in this invention can be used as amplifiers, oscillators, modulators, etc. for high frequency waves. As an example, an oscillator is depicted schematically in FIG. 7.

This oscillator consists of a glass tube 20, one end of which is of a larger diameter to contain an electron gun 21. A collector electrode 22 is mounted in the other end of this glass tube. The electron gun 21 is of conventional construction and the glass envelope is made vacuum tight. The current for the filament of the electron gun is provided for in a conventional way and is not shown in the drawing. The voltage $V_1$ is applied between the anode of the electron gun and the collector, potential $V_2$ is applied between the cathode and the anode of the electron gun, and a bias potential $V_3$ is applied between the grid and the cathode; these voltages are necessary in order to obtain an electron beam of the desired velocity and current density.

The vacuum envelope 20 lies in an axial hole 23 of a hollow cylinder of ferrite 24. This ferrite cylinder is mounted in the hollow cylindrical waveguide 25 which has an opening to admit the glass envelope 20. It should be understood, of course, that the ferrite cylinder may be within the vacuum envelope. The waveguide 25 is provided with a coupler 26 which is a coaxial conductor in which the inner conductor 27 forms a loop around the ferrite rod 24. The D.C. magnetic field is provided by solenoid 29 which surrounds the waveguide 25. This magnetic field serves to focus the electron beam as well as to provide the proper magnetic field density for the ferrite rod.

By proper choice of magnetic field strength and electron beam velocity, interaction occurs between the electron beam and the backward wave which propagates through the ferrite rod. The wave which has been generated can then be coupled from the ferrite rod by means of the coaxial line 26 which ends in a coupling loop 28.

Since the frequency of the generated wave is determined principally by the intensity of the magnetic field supplied by the solenoid, it is possible to frequency modulate the generated signal by connecting the modulating signal in series with the source supplying the coil 29.

Amplitude modulation is also possible by suitable variation of the strength of the electron beam, for instance, by supplying a modulating signal in series with the potential $V_3$ for the grid of the electron gun. The strength of the external magnetic field which must be supplied to cause precession resonance ferrite can be reduced whenever a permanently magnetized ferrite rod is used. An amplifier of high frequency waves will be realized by providing a coaxial coupler as previously described, to the waveguide near the collector electrode. The signal to be amplified is introduced by means of the coaxial conductor which terminates in the coupling loop, and the amplified signal is coupled out via the coaxial conductor at the electron gun end of tube.

The coupling loop described above is used whenever it is desired to couple to the circularly symmetric mode in the ferrite rod. It is clear that other coupling devices can be used to couple to other modes of propagation.

Since ferrites are insulators, it may be found advantageous to suitably dope the ferrite or place a thin slightly conducting layer on the ferrite. The problem is radio frequency losses but also slight conductivity is enough. One might utilize a thin evaporated film of metal, a thin stannous chloride film, or even a helical metal conductor (a helix) whose propagation velocity is far from the beam velocity.

What is claimed is:

1. A traveling wave tube comprising, in combination, means for producing a beam of electrons, means for collecting said beam, and a slow wave structure positioned along the path of said beam between said producing means and said collecting means for interaction between a component of an electromagnetic wave on said slow wave structure and said electron beam whereby a high frequency wave may be propagated on said slow wave structure interacting with said beam, said slow wave structure comprising a material possessing the properties of ferrimagnetic resonance, and means for magnetizing said slow wave structure at the ferrimagnetic resonance frequency of said material near the operating frequency of the traveling wave tube to obtain a negative transverse permeability in the material which in turn gives rise to a backward wave mode of propagation in the slow wave structure, said beam interacting with said backward wave.

2. A traveling wave tube according to claim 1 wherein said slow wave structure is formed of a ferrite material.

3. A traveling wave tube according to claim 2 wherein said ferrite is permanently magnetized.

4. A traveling wave tube according to claim 1 wherein said slow wave structure is contained within an electrically conducting structure.

5. A traveling wave tube according to claim 4 wherein said electrically conducting structure comprises a waveguide which is smaller in cross section than the value required for a wave to propagate in the waveguide when empty.

6. A traveling wave tube according to claim 2 wherein said ferrite structure is a rod with a longitudinal beam passage opening therein.

7. A traveling wave tube according to claim 2 wherein said ferrite is a rod and the electron beam goes in a helical path around the ferrite rod.

8. A traveling wave tube according to claim 1 wherein said wave propagating structure is formed by two spaced-apart conducting parallel plates and between which is placed a ferrite slab which fills a portion of the space between the two parallel plates, the magnetic field being directed parallel to the flat surface of the plates and perpendicular to the longitudinal direction of the plates, and means for directing a strip of electron beam in the longitudinal direction in the space above the ferrite slab and below one of the plates.

9. A traveling wave tube comprising, in combination, means for producing a beam of electrons, a collector for collecting said beam of electrons, a slow wave structure positioned between said beam producing means and said collector for interaction between a component of an electromagnetic wave on said slow wave structure and said electron beam, said slow wave structure comprising a material possessing the properties of ferrimagnetic resonance, means for magnetizing said slow wave structure at the ferrimagnetic resonance frequency of said material near the operating frequency of the traveling wave tube to obtain a negative transverse permeability in the material which in turn gives rise to a backward wave mode of propagation in the slow wave structure, said beam interacting with said backward wave to produce amplification of said backward wave, and output coupling means coupled mens coupled to said slow wave structure at the end thereof closest to said electron beam producing means for coupling wave energy from said slow wave structure.

10. A traveling wave tube according to claim 9 wherein said slow wave structure is formed of a ferrite material.

11. A traveling wave tube according to claim 10 wherein said ferrite is permanently magnetized.

12. A traveling wave tube according to claim 9 wherein said slow wave structure is contained within an electrically conducting structure.

13. A traveling wave tube according to claim 11 wherein said electrically conducting structure comprises a waveguide which is smaller in cross section than the value required for a wave to propagate in the waveguide when empty.

14. A traveling wave tube according to claim 10 wherein said ferrite structure is a rod with a longitudinal beam passage opening therein.

References Cited in the file of this patent

UNITED STATES PATENTS

| | | |
|---|---|---|
| 2,859,374 | Birdsall et al. | Nov. 4, 1958 |
| 2,911,554 | Kompfner et al. | Nov. 3, 1959 |
| 2,951,963 | Melchor et al. | Sept. 6, 1960 |

UNITED STATES PATENT OFFICE
CERTIFICATE OF CORRECTION

Patent No. 3,110,839                       November 12, 1963

Alvin W. Trivelpiece

It is hereby certified that error appears in the above numbered patent requiring correction and that the said Letters Patent should read as corrected below.

Column 6, line 45, strike out "mens coupled".

Signed and sealed this 4th day of August 1964.

(SEAL)
Attest:

ERNEST W. SWIDER
Attesting Officer

EDWARD J. BRENNER
Commissioner of Patents